United States Patent [19]
Hashizume et al.

[11] 4,380,397
[45] Apr. 19, 1983

[54] DUPLEX TYPE CONTINUOUS MIXER

[75] Inventors: Shinji Hashizume; Shinichi Fukumizu, both of Kobe, Japan

[73] Assignee: Kobe Steel, Ltd., Kobe, Japan

[21] Appl. No.: 225,774

[22] Filed: Jan. 16, 1981

[30] Foreign Application Priority Data

Jan. 16, 1980 [JP] Japan .................................. 55-3827
Jan. 20, 1980 [JP] Japan .................................. 55-10612[U]

[51] Int. Cl.³ ............................................. B28C 7/16
[52] U.S. Cl. ..................................... 366/77; 366/84; 366/88
[58] Field of Search ....................... 366/77, 83, 84, 85, 366/86, 97, 192, 193, 300, 301, 307, 88; 425/204

[56] References Cited

U.S. PATENT DOCUMENTS 2,994,100  8/1961  Comes et al. .
3,143,767  8/1964  Wirth et al. .
3,154,808  11/1964  Ahlefeld et al. .
3,195,868  7/1965  Loomans et al. .
3,349,432  10/1967  Breneman .................... 366/84 X
3,419,250  12/1968  Brennan, Jr. .
3,630,689  12/1971  Wheeler et al. .
3,780,994  12/1973  Kneller et al. .
3,802,670  4/1974   Okada et al. .
3,823,921  7/1974   Brennan, Jr. et al. .
4,136,968  1/1979   Todd .

FOREIGN PATENT DOCUMENTS 2223792  3/1973  Fed. Rep. of Germany .
2513577  10/1975  Fed. Rep. of Germany .

Primary Examiner—Philip R. Coe
Assistant Examiner—Joseph M. Pitko
Attorney, Agent, or Firm—Oblon, Fisher, Spivak, McClelland & Maier

[57] ABSTRACT

A continuous mixer of the duplex type which has within a chamber a pair of mixing shafts each with a feed portion, a mixing portion and a discharge portion is disclosed. The mixer includes a weir member provided on the bottom wall of the chamber at a position opposing the discharge portions of the respective mixing shafts, to prevent short-passes of unmelted material.

3 Claims, 9 Drawing Figures

DUPLEX TYPE CONTINUOUS MIXER

BACKGROUND OF THE INVENTION

1. Field of the Invention

This invention relates to a continuous mixer with an improved mixing ability.

2. Description of the Prior Art

For mixing high molecular weight substances like synthetic resins, there have been known and used continuous type mixers which continuously mix and discharge feed materials. Of the continuous mixers, the duplex type which has a pair of parallel mixing shafts within a chamber is favored over the single type for its superiority in shearing and melting, and its mixing efficiency, resulting in a shorter mixing time.

In a mixing operation by the duplex type continuous mixer, however, there sometimes occurs the so-called short-pass phenomenon, whose occurrence depends upon the kinds of the mixing materials used, such as synthetic resins, or on the mixing ratio, the short-pass phenomenon allowing unmelted materials to pass through the mixer without undergoing shearing work. With the conventional continuous mixers of the above-mentioned type, it is difficult to prevent the short-pass phenomenon, so that there is always a possibility that unmelted material is mixed into and discharged along with melted material without the unmelted material undergoing sufficient mixing, thereby impairing uniform mixing and lowering the quality of the resulting product.

SUMMARY OF THE INVENTION

The present invention has as its object the provision of a continuous mixer employing a weir means which precludes the above-mentioned short-pass phenomenon, to ensure uniform mixing and enhance the quality of the resulting product.

It is another object of the present invention to provide a continuous mixer employing mixing shafts which are easily extractable to facilitate changes of the color of the mixing material and the cleaning of the mixing shafts, or other maintenance and service.

According to one preferred aspect of the present invention, there is provided a continuous mixer of the duplex type which has within a chamber, a pair of parallel mixing shafts each having a feed portion, a mixing portion and a discharge portion. The mixer also has a weir member retractably provided on the bottom of the chamber at a position opposing the discharge portions of the mixing shafts, and adjusting means located between the chamber and the weir member to adjust the height of the weir member in the chamber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
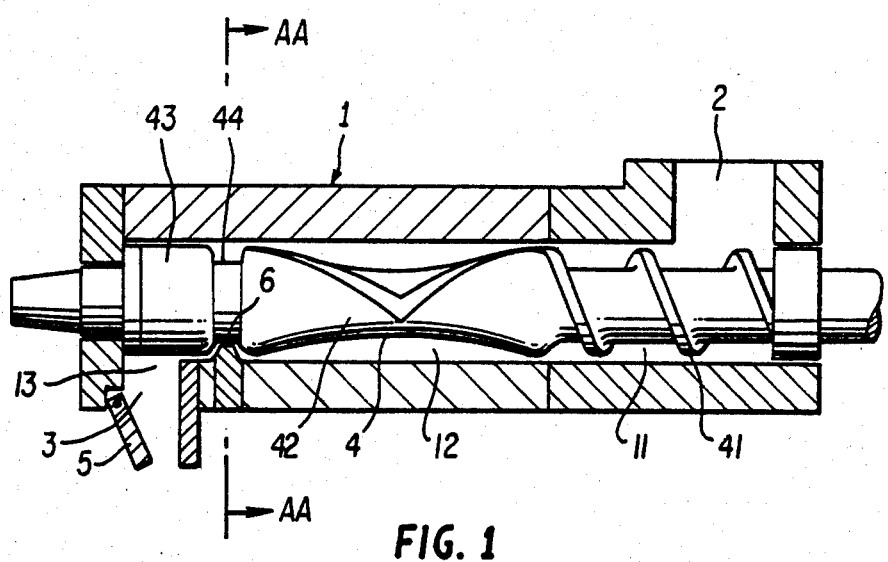
FIG. 1 is an elevation sectional view of the mixer of the present invention.
Figure 2:
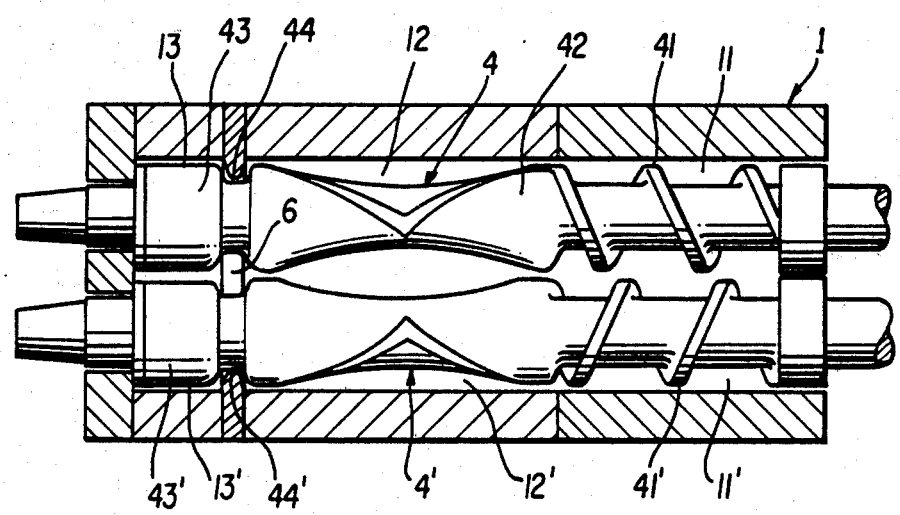
FIG. 2 is a plan sectional view of the mixer of the present invention.

Referring to FIG. 1, indicated at 1 is a casing which has an inlet 2 and an outlet 3 at opposite ends thereof and defines an interior chamber of binocular shape in cross-section for receiving a pair of parallel mixing shafts 4.

Each mixing shaft 4 is provided, as seen from the inlet end 2, with a feed portion 41, a mixing portion 42 and a discharge portion 43. The feed portion 41 is shaped in the form of a screw, while the mixing portion 42 is formed adjacent the feed portion with a blade of an oval shape in section which is twisted in the same direction as the screw of the feed portion from its initial end to a median point, followed by a second blade which is twisted in the reverse direction, the second blade extending from the median point to the other end of the mixing portion. The discharge portion 43 is formed with a straight blade of the same sectional shape as that of the blades in mixing portion 42.

Corresponding to the respective portions of the mixing shafts 4, the casing 1 is provided within its chamber with feed chambers 11, mixing chambers 12 and discharge chambers 13 continuously extending in the axial direction. Each pair of chambers which are located side-by-side in cross-section are also in communication with each other. An orifice having a gate 5 which is capable of adjusting the orifice opening is provided at the outlet 3.

In the above-described duplex type continuous mixer, according to the present invention, a weir member 6 is provided on the bottom walls of the discharge chambers 13. Preferably, the weir member 6 is vertically retractably supported in a groove 14 which is provided in the bottom walls of the discharge chambers 13 within the chamber 1. The height of the weir member 6 which is projected into the chamber 1 is adjustable from outside through a bolt, a handle or a pneumatic or hydraulic cylinder.

The weir member 6 is in the form of a plate which is concave at its upper end and arcuately formed along the inner peripheral walls at the bottoms of the respective discharge chambers 13. In the embodiment shown in FIG. 5, the weir member 6 is adjustably and detachably fixed at the bottoms of the discharge chambers 13 by means of adjusting bolts 61 and fixing bolts 62.

Figure 3:
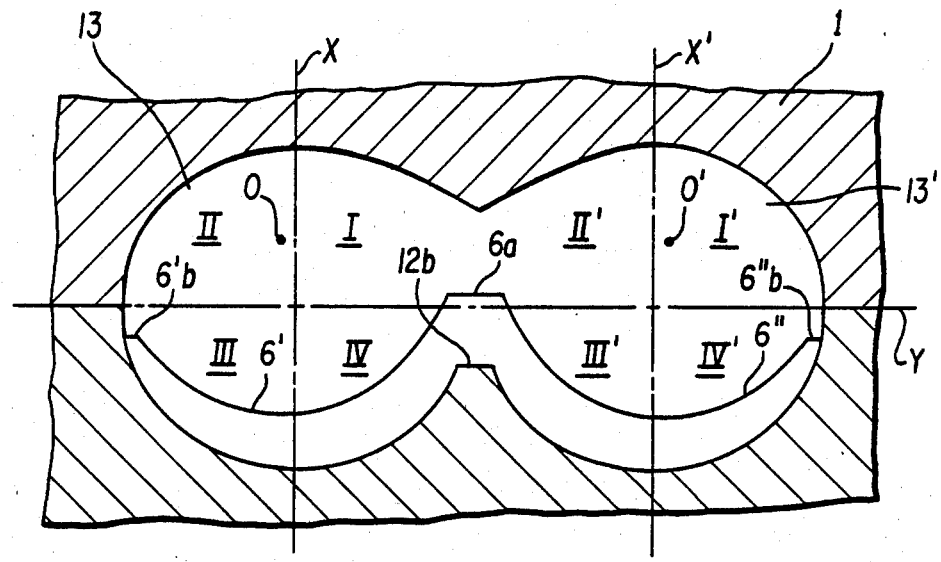
FIG. 3 is a schematic cross-sectional representation of the weir member of the present invention.

Preferably, the upper edge of the weir member 6 is concave along the bottom walls of the discharge chambers 13, thus arcs 6' and 6" have the respective centers 0 and 0' in upper outer quadrants defined by vertical and horizontal axes X or X' and Y intersecting at the centers of the discharge chambers 13 in the cross-sections thereof, as shown in FIG. 3. The center ridge 6a between the arcs 6' and 6" is located above the horizontal axis Y and the opposite side ridges are suitably rounded off at the respective upper edges as indicated at 6b' and 6b".

On the other hand, the mixing shafts 4 are provided with an annular groove 44 in the respective discharge portions 43 at a position confronting the weir member 6, thereby ensuring smooth rotation of the mixing shafts 4.

The chamber 1 is preferably dividable into separate upper and lower halves at least at the discharge chambers 13 or at the discharge and mixing chambers 12 and 13.

In operation, the mixing material A in the form of pellets or powder, which is fed through the inlet 2 of the casing 1, is sent forward to the mixing chambers 12 by the feed portions 41 of the mixing shafts 4 and subjected to mixing action as follows.

Figure 4:
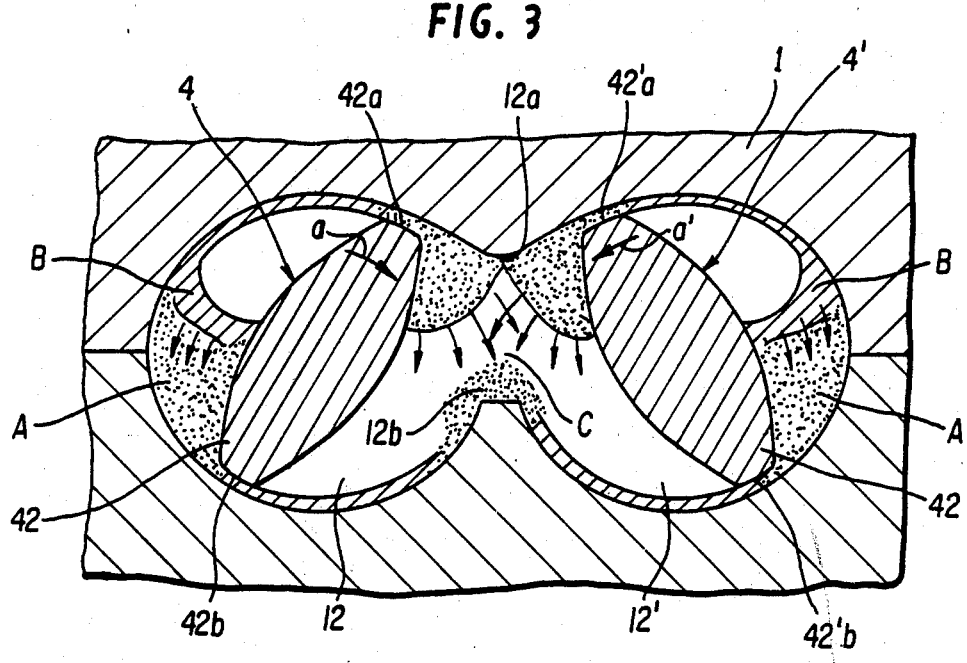
FIG. 4 is a schematic cross-sectional representation of the operation of the blades and mixing chamber in the present invention.

The material A is rotated in the directions indicated by arrows (a) and (a'), and maintained rotationally forward of the blades of the mixing shafts 42, as shown in FIG. 4, during which part of the material A is heated and melted by shearing heat while passing through the clearances between the tip lands 42a 42a', 42b and 42b' at the fore ends of the blades of the mixing portions 42 and the inner wall surfaces of the mixing chambers 12. On the other hand, unmelted material A still exists rotationally forward of the mixing blades under a layer of material B which has been melted by the shearing actions of the tip land. At the boundaries of the melted and unmelted layers, the former mingles into the latter and heat transfer occurs therebetween to melt and mix the latter.

In this instance, while the mixing shafts 4 make one revolution, only part of the material A passes through the aforementioned clearances and the major part of the material remains rotationally forward of the mixing blades. As the tip lands pass an intersecting point 12a of the upper walls of the mixing chambers 12, due to the rotation of the mixing portions 42, the melted and unmelted portions, as well as partly mixed portions, of the material are mingled and released into the center space C between the mixing portions 42 and then distributed into the two mixing chambers 12 and 12' by the ridge 12b at the intersection of the bottom walls of the mixing chambers 12. By repeating these actions, the material A is gradually melted and mixed before being pushed into the discharge chambers 13 by the succeeding material which is continuously charged into the feed chambers 11.

In such a mixing state, part of the material advancing through the intermediate or terminal end portions of the mixing chambers 12, when released into the center space C by the rotation of the mixing portions 42, tends to plunge into the discharge chambers 13 before it is distributed in the mixing chambers 12 by the bottom ridge 12b, or tends to flow into discharge chambers 13 immediately after being distributed by the bottom ridge 12b.

In such a case, since there is no obstacle on the inner wall surface, particularly on the bottom wall of the chamber, which has the same sectional shape in both mixing and discharge chambers, the material which tends to plunge or flow into the discharge chambers from the intermediate or terminal end portions of the mixing chambers is allowed to do so without meeting any resistance. This is the phenomenon which is generally referred to as "short-pass", thus allowing the unmelted material to pass through the mixing chambers. The material which is sent into the discharge chambers is delivered out of the machine through the outlets by the discharge portions of the mixing shafts, without undergoing any positive mixing in the discharge chambers. Therefore, in the mixing operation by the conventional mixer, the short-pass of unmelted material has been one of the factors which impair the quality of the ultimate product.

According to the present invention, the material which tends to plunge or flow into the discharge chambers from the intermediate or terminal end portions of the mixing chambers 12 strikes the weir member 6 which is projected into the discharge chambers 13 through the bottom walls thereof and returned to the mixing chambers 12 to undergo therein shearing, melting and mixing actions in the same manner as described hereinbefore. Therefore, in addition to the prevention of the aforementioned short-pass phenomenon, it becomes possible to minimize the residence time distribution (time differences) and make uniform the residence time in the mixing chamber for all of the material. It also becomes possible to raise the rate of shearing action, or the shear rate, thereby enhancing the melting and mixing efficiencies to ensure sufficient mixing.

The material which is completely melted and mixed in the mixing chambers 12 is pushed forward by the succeeding material from the feed chambers 11 and flows over the weir member 6 and into the discharge chambers 13, and is finally delivered out of the machine through the outlet 3 by the discharge portions 43 of the mixing shafts 4.

In this manner, the short-pass phenomenon is prevented by the weir member 6 which is projected into the discharge chambers 13 through the bottom walls thereof. In this connection, if the weir member 6 is provided integrally with the casing 1 without any adjusting means, it sometimes becomes difficult to maintain the optimum shearing and residence time for the mixed material which is being sent forward to the discharge chambers 13 over the weir member 6, depending upon the kind, and particularly the viscosity, of the material, and there is a possibility of the material being decomposed due to overheating. Further, with a mixer of this sort, there occurs the necessity for extracting the mixing shafts 4 from the casing 1 for changing the color of the mixing material, cleaning the mixing shafts 4 or for other purposes. The extraction of the mixing shafts 4 is difficult in a case where the weir member 6 is formed integrally with the casing 1.

According to the present invention, the height of the weir member 6 is adjustable depending upon the nature of the material to be mixed, so that it is posssible to effect the mixing with optimum shearing and residence time for any material. In addition, if the projection of the weir member 6 is reduced to zero by retracting the weir completely into the groove 14, the mixing shafts 4 can be freely moved in the axial direction and thus easily inserted into and extracted from the casing 1 at the time of changing the color of the material, for cleaning the mixing shafts 4 or for other purposes.

Figure 5:
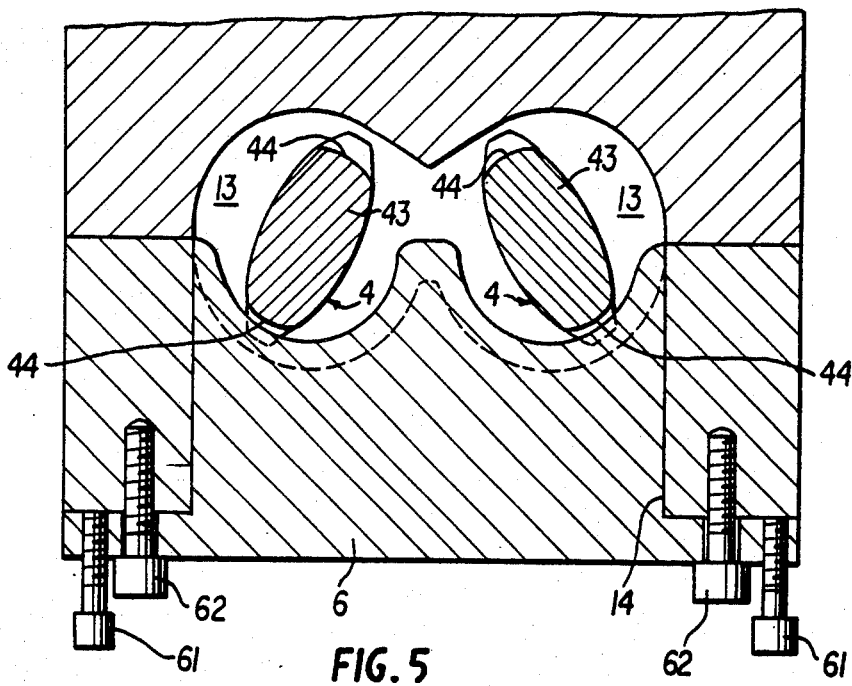
FIGS. 5 through 9 are cross-sectional views, taken along line AA—AA in FIG. 1, of preferred embodiments of the weir adjusting device.
Figure 6:
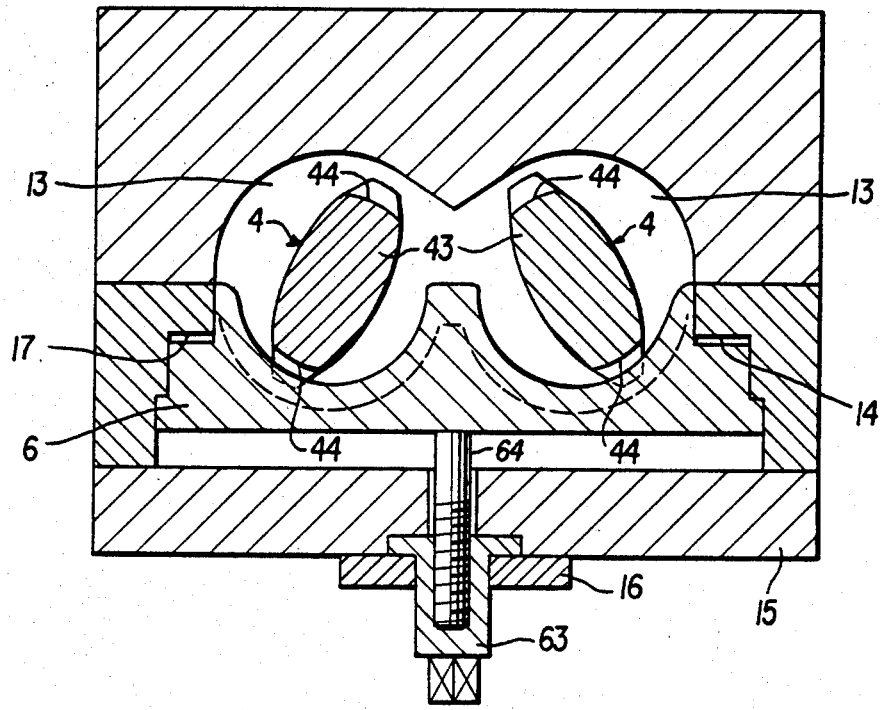
Figure 7:
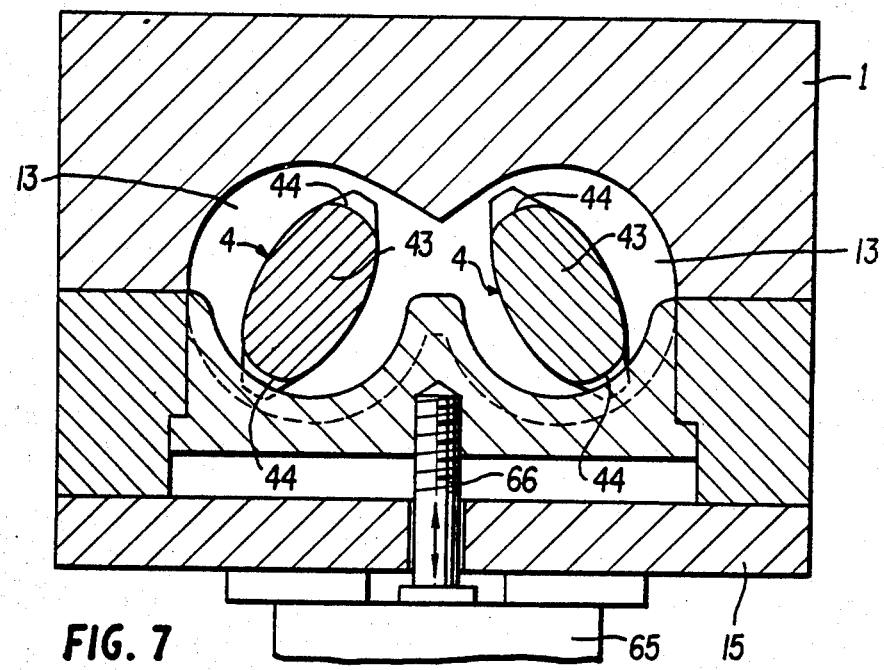
Figure 8:
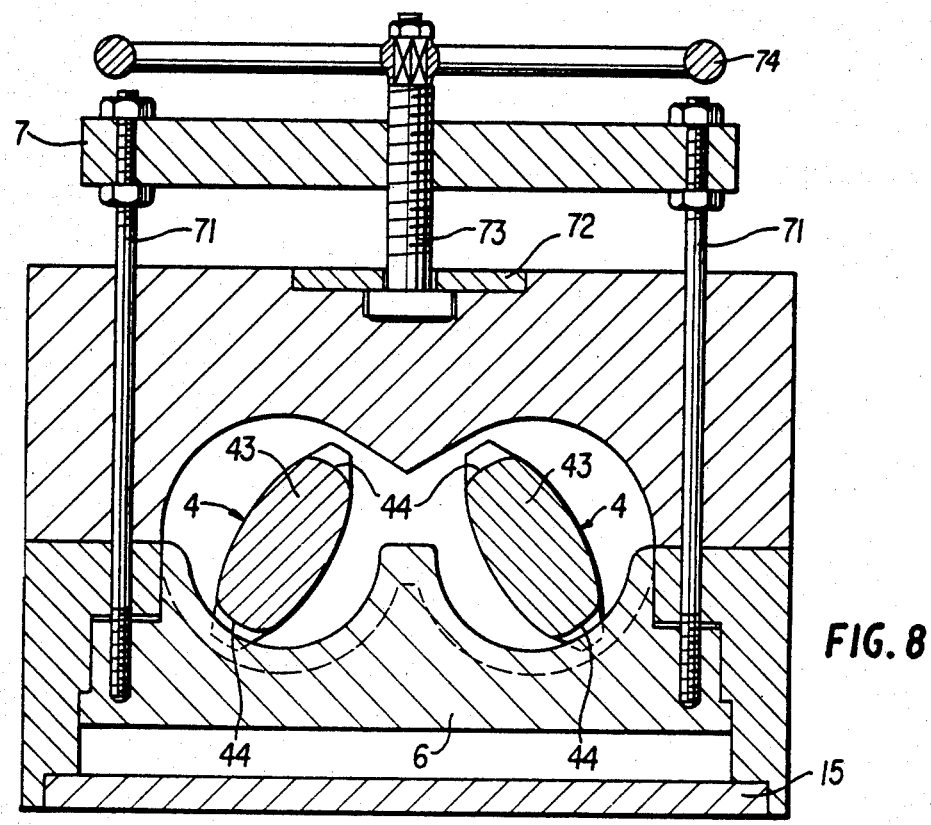

The means for adjusting the projected height of the weir member 6 is not limited to the particular example shown in FIG. 5 and may be arranged in other manners such as shown in FIGS. 6 to 8.

Referring to FIG. 6, a lid member 15 is detachably fixed on the opening at the lower end of the groove 14 in the bottom walls of the discharge chambers 13, and a rotary knob 63 is rotatably supported on the lid member 15 through a holder plate 16. The rotary knob 63 is threaded onto the lower end of a screw rod 64 which is projected downward from the lower end of the weir member 6. Thus, upon rotating a single knob 63, the weir member 6 is raised or lowered as desired within the groove 14 for fine adjustment of its height within the discharge chambers 13. The upper and lower positions of the weir member 6 is limited by a stopper surface 17 and the lid member 15, respectively. The rotation of the knob 63 is facilitated by providing a handle thereon (not shown).

In FIG. 7, a hydraulic or pneumatic cylinder 65 is employed in place of the rotary knob 63 of FIG. 6. The cylinder 65 is mounted on the lid member 15 and has the projected end of its rod 66 threadedly connected to the weir member 6. In this case, it is possible to lift the weir member 6 up and down by use of the cylinder 65 which can be actuated by one-touch button operation or by any other automatic operation.

Although the weir member 6 is lifted up and down by operations from beneath the casing 1 in the embodiments of FIGS. 5 to 7, it is manipulated from above the chamber 1 in the embodiment of FIG. 8. More particularly, the weir member 6 is connected to a lift member 7 by a plural number of tie bolts 71 which are extended through the walls of the casing 1. The lift member 7 is threadedly engaged with a screw rod 73 which is rotatably supported on the upper wall of the casing 1 by a holder plate 72. Thus, upon rotating the screw rod 73 by a handle 74, the weir member 6 is lifted or lowered through the lift member 7 and tie bolts 71.

Figure 9:
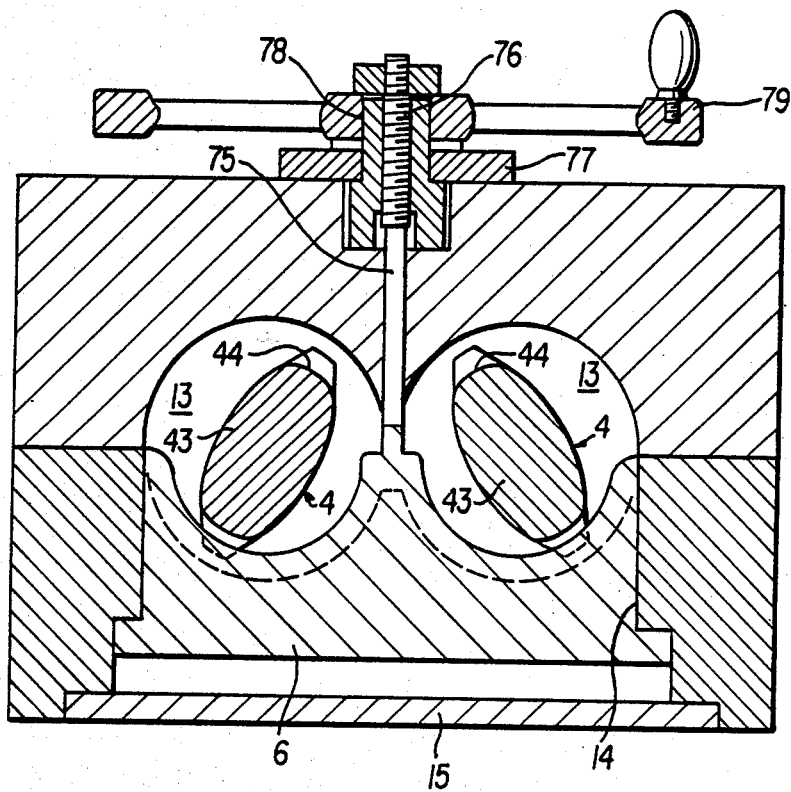

In the embodiment of FIG. 9, an upwardly projecting rod 75 is provided at the center of the weir member 6, the rod 75 being extended upward through the wall of the casing 1 and having its externally threaded portion 76 in engagement with an internally threaded rotary member 78 which is rotatably supported on the casing 1 through a holder plate 77. The weir member 6 is thus lifted up and down by rotating a handle 79 of the rotary member 78.

In FIGS. 8 and 9, the rotary member may be turned by a spanner instead of the handles 74 and 79 or by a hydraulic or pneumatic cylinder if desired. In a case where the weir member 6 is lifted up and down by operations from above the casing 1, there is no possibility of the lifting operation being inteferred with by a table or frame (not shown) which supports the mixer thereon.

Although some examples of the lift means for the adjustment of the weir member have been shown, it is not limited to the particular examples shown and is susceptible of various modifications and alterations within the scope of the invention.

As is clear from the foregoing description, the provision of the weir member in the discharge chambers prevents the short-pass phenomenon and contributes to uniformity in the residence time of the material in the mixing chambers, thereby minimizing irregularities in the mixing degree and enhancing the quality of the products to a considerable extent.

Moreover, it becomes possible to always optimally mix various materials by adjusting the height of the weir member depending upon the nature of the material to be mixed.

The chamber is not necessarily required to be of the split type since the mixing shafts can be easily extracted or inserted upon retracting the weir member. Therefore, the assembling and disassembling jobs, as well as the cleaning work for the removal of deposited material from the chamber or the mixing shafts, are facilitated considerably. For instance, when it is desired to change the mixing material from a black resin to a white resin, a large quantity of material loss occurs before the mixed material completely turns white in the case where the white resin is fed continuously without cleaning the inside of the mixer. According to the present invention, the loss of material is substantially avoided and the cleaning can be finished within a short time period, as is required for the change of color.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A duplex type continuous mixer, comprising:
   a casing having an inlet and an outlet at opposite ends thereof and defining a pair of parallel cavities extending between said inlet and outlet;
   a pair of mixing shafts rotatably received in said cavities and each having a feed portion, a mixing portion, a discharge portion and an annular groove separating said mixing and discharge portions; and
   a weir member projected upwardly from the bottom walls of said cavities at a position corresponding to said annular groove of said mixing shafts so as to prevent the short-passes of unmelted materials, wherein the cross sectional profile of the top surface of said weir member is identical to the cross-sectional profile of said bottom walls of said cavities.

2. A duplex type continuous mixer, comprising:
   a casing having an inlet and an outlet at opposite ends thereof and defining a pair of parallel cavities extending between said inlet and outlet;
   a pair of mixing shafts rotatably received in said cavities and each having a feed portion, a mixing portion and a discharge portion, said discharge portion having a first section adjacent said mixing portion; and
   a weir member projected upwardly from the bottom walls of said cavities at a position corresponding to said first section of said discharge portions of said mixing shafts so as to prevent the short-passes of unmelted material, wherein said weir member is vertically adjustably supported in the bottom walls of said cavities, wherein the cross sectional profile of the top surface of said weir member is identical to the cross sectional profile of said bottom walls of said cavities.

3. The duplex type continuous mixer of claim 1 or 2, further comprising means for adjusting the height of the projection of said weir member into said cavities.

* * * * *